United States Patent
Dhagat et al.

(10) Patent No.: US 10,146,036 B2
(45) Date of Patent: Dec. 4, 2018

(54) SEMICONDUCTOR WAFER INSPECTION USING CARE AREA GROUP-SPECIFIC THRESHOLD SETTINGS FOR DETECTING DEFECTS

(71) Applicant: GLOBALFOUNDRIES INC., Grand Cayman (KY)

(72) Inventors: Parul Dhagat, Clifton Park, NY (US); Ananthan Raghunathan, San Jose, CA (US); Vikas Sachan, Cupertino, CA (US); Dmitry A. Vengertsev, Boise, ID (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 297 days.

(21) Appl. No.: 15/175,101

(22) Filed: Jun. 7, 2016

(65) Prior Publication Data
US 2017/0352145 A1 Dec. 7, 2017

(51) Int. Cl.
*G06T 7/00* (2017.01)
*G02B 21/00* (2006.01)

(52) U.S. Cl.
CPC ....... *G02B 21/002* (2013.01); *G02B 21/0016* (2013.01); *G06T 7/0004* (2013.01);
(Continued)

(58) Field of Classification Search
CPC . G06T 2207/30148; G06T 2207/10061; G06T 7/001; G06T 7/0004; G06T 7/0006; G06T 7/0008
See application file for complete search history.

(56) References Cited

U.S. PATENT DOCUMENTS 7,330,279 B2   2/2008   Vuong et al.
7,676,077 B2   3/2010   Kulkarni et al.
(Continued)

FOREIGN PATENT DOCUMENTS

WO   2008077100 A2   6/2008

OTHER PUBLICATIONS

Akira Hamamatsu et al., "Statistical Threshold Method for Semiconductor Inspection", 12th A-PCNDT 2006—Asia-Pacific Conference on NDT, Nov. 5-10, 2006, Auckland, New Zealand, pp. 1-8.
(Continued)

*Primary Examiner* — Wesley J Tucker
(74) *Attorney, Agent, or Firm* — Gibb & Riley, LLC; Michael J. LeStrange, Esq.

(57) ABSTRACT

In the methods and systems, optical images of inspection care areas on a semiconductor wafer are acquired and analyzed to detect defects. However, during this analysis, the same threshold setting is not used for all inspection care areas. Instead, care areas are grouped into different care area groups, based on different design layouts and properties. Each group is associated with a corresponding threshold setting that is optimal for detecting defects in the inspection care areas belonging to that group. The assignment of the care areas to the different groups and the association of the different threshold settings with the different groups are noted in an index. This index is accessible during the analysis and used to ensure that each of the inspection care areas in a specific care area group is analyzed based on a corresponding threshold setting that is optimal for that specific care area group.

20 Claims, 10 Drawing Sheets

(52) U.S. Cl.
CPC ............... *G06T 2207/10004* (2013.01); *G06T 2207/10061* (2013.01); *G06T 2207/20012* (2013.01); *G06T 2207/20021* (2013.01); *G06T 2207/30148* (2013.01)

(56) References Cited

U.S. PATENT DOCUMENTS

| | | | |
|---|---|---|---|
| 7,877,722 | B2 | 1/2011 | Duffy et al. |
| 7,894,659 | B2 | 2/2011 | Chen et al. |
| 8,171,364 | B2 | 5/2012 | Veillette |
| 8,781,781 | B2 | 7/2014 | Kulkarni et al. |
| 8,853,628 | B2 | 10/2014 | Hosoya et al. |
| 9,171,364 | B2 | 10/2015 | Wu et al. |
| 2006/0226847 | A1 | 10/2006 | Fure et al. |
| 2007/0156379 | A1* | 7/2007 | Kulkarni ............ G06F 17/5045 703/14 |
| 2007/0288219 | A1* | 12/2007 | Zafar ................... G03F 1/84 703/14 |
| 2008/0220384 | A1* | 9/2008 | Bridgwater ........... F23D 14/72 431/18 |
| 2012/0029858 | A1 | 2/2012 | Kulkarni et al. |
| 2013/0252350 | A1 | 9/2013 | Lee et al. |
| 2014/0301630 | A1 | 10/2014 | Kulkarni et al. |
| 2014/0376802 | A1 | 12/2014 | Wu et al. |

OTHER PUBLICATIONS

Stan Stokowski et al., "Wafer Inspection Technology Challenges for ULSI Manufacturing", KLA-Tencor, One Technology Drive, Milpitas, CA 95035, (Date Unknown), pp. 1-11.

\* cited by examiner

| Care Area Identifier | Care Area Location | Care Area Group Identifier | Optimal Threshold Setting Level |
|---|---|---|---|
| 401a | | 703 | 3 |
| 401b | | 706 | 6 |
| 401c | | 705 | 5 |
| 401d | | 701 | 1 |
| 401e | | 703 | 3 |
| 401f | | 703 | 3 |
| 401g | | 708 | 8 |
| 401h | | 708 | 8 |
| 401i | | 706 | 6 |
| 401j | | 705 | 5 |
| 401k | | 702 | 2 |
| 401l | | 701 | 1 |
| 401m | | 704 | 4 |
| 401n | | 707 | 7 |
| 401o | | 707 | 7 |
| 401p | | 701 | 1 |

FIG. 8

SEMICONDUCTOR WAFER INSPECTION USING CARE AREA GROUP-SPECIFIC THRESHOLD SETTINGS FOR DETECTING DEFECTS

FIELD OF THE INVENTION

The present invention relates to semiconductor wafer inspection and, more specifically, inspection methods and systems that use optimal threshold settings for detecting defects in inspection care areas during semiconductor wafer inspection.

BACKGROUND

During integrated circuit manufacturing, optical inspections of semiconductor wafers (also referred to herein as process limiting yield (PLY) inspections) are performed after each process in the integrated circuit manufacturing line in order to detect defects of interest (DOI) (e.g., critical defects that have the potential to decrease yield). Specifically, during an optical inspection, semiconductor wafers are inspected using a first optical inspection tool in order to capture optical images. The captured optical images are then analyzed to detect defects in inspection care areas (i.e., previously defined areas of interest on the semiconductor wafers), based on a threshold setting for detecting defects. It should be noted that the threshold setting for detecting defects is also referred to herein as the inspection recipe used for detecting defects or the sensitivity threshold for detecting defects. In any case, subsequently, a sample of the inspection care areas is selected (i.e., a smaller representative population of the inspection care areas is selected) and the defects in the inspection care areas in the sample are further inspected using a second optical inspection tool and, particularly, a scanning electron microscope (SEM) in order to capture SEM images. The SEM images of the defects are then analyzed to identify critical defect types (i.e., to classify the defects into different types).

Typically, the first optical inspection tool uses the same threshold setting for detecting defects in all of the different inspection care areas. However, for a given inspection care area, this threshold setting may be either: (a) too low, resulting in overwhelming detection of false defects (e.g., due to wafer or system noise) or nuisance defects (e.g., actual defects identified as non-critical or not affecting yield); or (b) too high, resulting in a failure to detect critical defects. Alternatively, the first optical inspection tool uses different threshold settings for detecting defects in each of the different inspection care areas, respectively. However, determining optimal threshold settings for the different inspection care areas, individually, can be costly in terms of both time and resources. Thus, in deciding how to proceed with the optical inspections, defect engineers in the fab must choose between accuracy and costs.

SUMMARY

In view of the foregoing, disclosed herein are inspection methods and systems that can be used during integrated circuit chip design and fabrication. In the methods and systems, optical images of previously defined inspection care areas on a semiconductor wafer can be acquired and analyzed to detect defects. However, during the analysis of the optical images, the inspection methods and systems do not use the same threshold setting for detecting defects in all of the inspection care areas. Instead, the inspection care areas can be grouped into different care area groups, based on different design layouts and properties (e.g., different combinations of design properties). Each different care area group can be associated with a corresponding threshold setting that is optimal for detecting defects in the inspection care areas belonging to that group. The assignment of the inspection care areas to the different care area groups and the association of the different threshold settings with the different care area groups, respectively, can be noted in an index. This index can be accessible during the analysis of the optical images and can be used to ensure that each of the inspection care areas in a specific care area group is analyzed based on a corresponding threshold setting that is optimal for that specific care area group. Thus, the methods and systems provide for performing optical inspections of semiconductor wafers using different threshold settings for detecting defects in different groups of inspection care areas without incurring significant cost increases.

More particularly, disclosed herein is an inspection method that can be used during integrated circuit chip design and fabrication.

In the method, an index of previously defined inspection care areas on the semiconductor wafer can be generated and stored in a memory. This index can indicate assignment of inspection care areas to different care area groups. That is, each inspection care area can be assigned to one of multiple different care area groups. For example, the inspection care areas can be assigned to the different care area groups based on different design properties. The different design properties can include, but are not limited to, different pattern density levels, different percentages of edges oriented in an x-direction and a y-direction, different pattern complexity levels and/or different combinations of any of the different pattern density levels, the different percentages of edges oriented in the x-direction and the y-direction, and the different pattern complexity levels. The index can further associate different threshold settings with the different care area groups, respectively. Specifically, each threshold setting associated with each care area group can be an optimal threshold setting for detecting defects in any inspection care areas belonging to that care area group.

Additionally, in the method, optical images of the inspection care areas can be received by a processor from an optical inspection tool and can be analyzed, by the processor, to detect defects in the inspections care areas. Specifically, during this optical image analysis process, the index can be accessed by the processor from the memory and used such that each inspection care area and, more particularly, each optical image of each inspection care area belonging to a specific care area group is analyzed based on a corresponding threshold setting associated in the index with that specific care area group.

Also disclosed herein is an inspection system that can be used during integrated circuit chip design and fabrication.

The system can have a memory that stores an index of previously defined inspection care areas on the semiconductor wafer. This index can indicate assignment of inspection care areas to different care area groups. That is, each inspection care area can be assigned to one of multiple different care area groups. For example, the inspection care areas can be assigned to the different care area groups based on different design properties. The different design properties can include, but are not limited to, different pattern density levels, different percentages of edges oriented in an x-direction and a y-direction, different pattern complexity levels and/or different combinations of any of the different pattern density levels, the different percentages of edges oriented in the x-direction and the y-direction, and the different pattern complexity levels. The index can further associate different threshold settings with the different care area groups, respectively. Specifically, each threshold setting associated with each care area group can be an optimal threshold setting for detecting defects in any inspection care areas belonging to that care area group.

The system can further have a processor that is in communication with the memory and with an optical inspection tool. The processor can receive optical images of the inspection care areas from the optical inspection tool and can analyze those optical images to detect defects in the inspections care areas. Specifically, during this optical image analysis process, the processor can access the index and can use the index such that each inspection care area and, more particularly, each optical image of each inspection care area belonging to a specific care area group is analyzed based on a corresponding threshold setting associated in the index with that specific care area group.

Also disclosed herein is a computer program product. This computer program product can be a computer readable storage medium having program instructions embodied therewith. The program instructions can be executable by a processor to cause the processor to perform an inspection method that can be used during integrated circuit chip design and fabrication, as described above.

BRIEF DESCRIPTION OF THE SEVERAL VIEWS OF THE DRAWINGS

The present invention will be better understood from the following detailed description with reference to the drawings, which are not necessarily drawn to scale and in which:

FIG. 8 is a table illustrating an exemplary inspection care area index;

DETAILED DESCRIPTION

Figure 1:
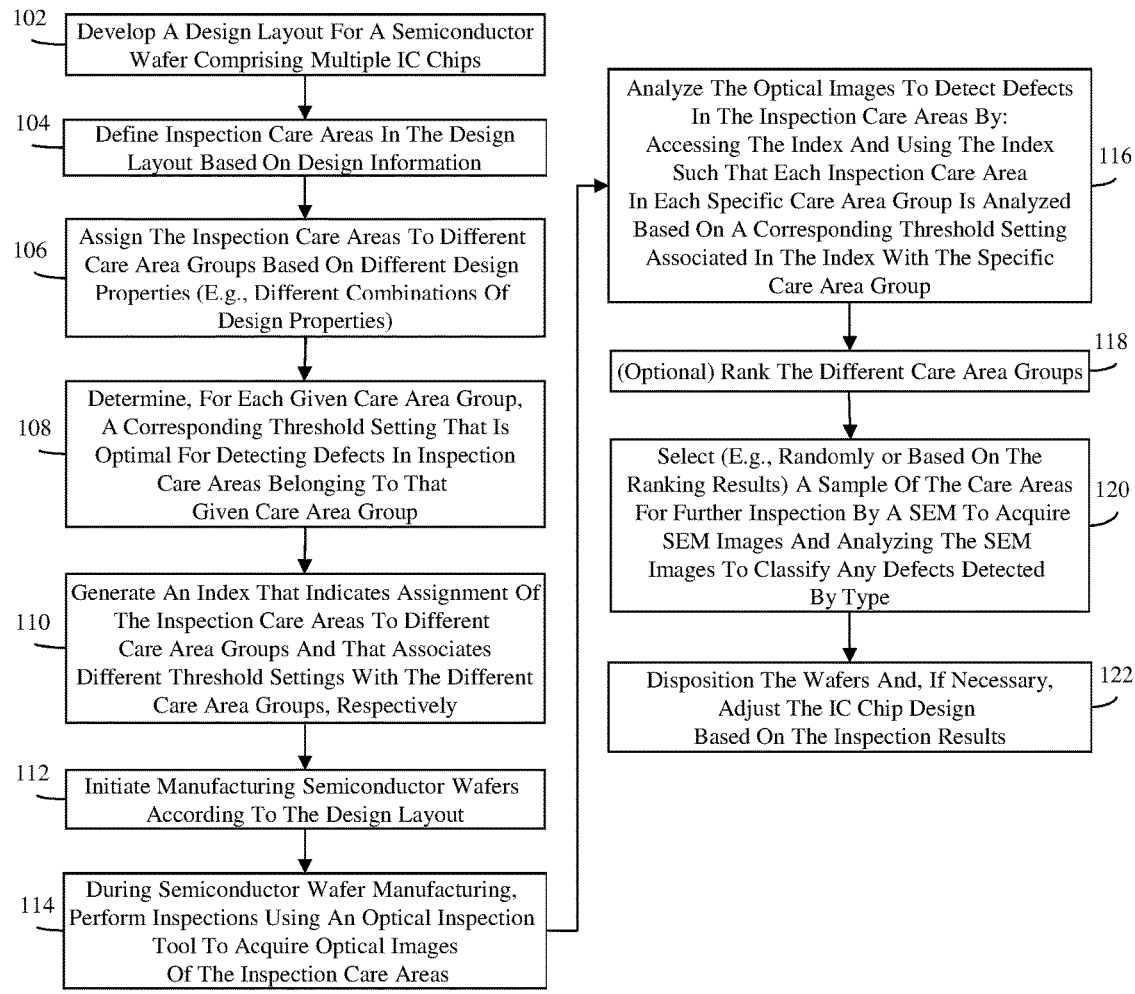
FIG. 1 is a flow diagram illustrating an inspection method that can be used during integrated circuit chip design and fabrication.

As mentioned above, during integrated circuit manufacturing, optical inspections of semiconductor wafers (also referred to herein as process limiting yield (PLY) inspections) are performed after each process in the integrated circuit manufacturing line in order to detect defects of interest (DOI) (e.g., critical defects that have the potential to decrease yield). Specifically, during an optical inspection, semiconductor wafers are inspected using a first optical inspection tool in order to capture optical images. The captured optical images are then analyzed to detect defects in inspection care areas (i.e., previously defined areas of interest on the semiconductor wafers), based on a threshold setting for detecting defects. It should be noted that the threshold setting for detecting defects is also referred to herein as the inspection recipe used for detecting defects or the sensitivity threshold for detecting defects. In any case, subsequently, a sample of the inspection care areas is selected (i.e., a smaller representative population of the inspection care areas is selected) and the defects in the inspection care areas in the sample are further inspected using a second optical inspection tool and, particularly, a scanning electron microscope (SEM) in order to capture SEM images. The SEM images of the defects are then analyzed to identify critical defect types (i.e., to classify the defects into different types).

Typically, the first optical inspection tool uses the same threshold setting for detecting defects in all of the different inspection care areas. However, for a given inspection care area, this threshold setting may be either: (a) too low, resulting in overwhelming detection of false defects (e.g., due to wafer or system noise) or nuisance defects (e.g., actual defects identified as non-critical or not affecting yield); or (b) too high, resulting in a failure to detect critical defects. Alternatively, the first optical inspection tool uses different threshold settings for detecting defects in each of the different inspection care areas, respectively. However, determining optimal threshold settings for the different inspection care areas, individually, can be costly in terms of both time and resources. Thus, in deciding how to proceed with the optical inspections, defect engineers in the fab must choose between accuracy and costs.

In view of the foregoing, disclosed herein are inspection methods and systems that can be used during integrated circuit chip design and fabrication. In the methods and systems, optical images of previously defined inspection care areas on a semiconductor wafer can be acquired and analyzed to detect defects. However, during the analysis of the optical images, the inspection methods and systems do not use the same threshold setting for detecting defects in all of the inspection care areas. Instead, the inspection care areas can be grouped into different care area groups, based on different design layouts and properties (e.g., different combinations of design properties). Each different care area group can be associated with a corresponding threshold setting that is optimal for detecting defects in the inspection care areas belonging to that group. The assignment of the inspection care areas to the different care area groups and the association of the different threshold settings with the different care area groups, respectively, can be noted in an index. This index can be accessible during the analysis of the optical images and can be used to ensure that each of the inspection care areas in a specific care area group is analyzed based on a corresponding threshold setting that is optimal for that specific care area group. Thus, the methods and systems provide for performing optical inspections of semiconductor wafers using different threshold settings for detecting defects in different groups of inspection care areas without incurring significant cost increases.

More particularly, referring to the flow diagram of FIG. 1, disclosed herein is an inspection method that can be used during integrated circuit chip design and fabrication.

Specifically, an initial design for an integrated circuit (IC) chip can be developed by a designer. This initial design can be represented by a high-level description, which sets out the requirements for the IC chip. This high-level description can be stored in memory in, for example, a hardware description language (HDL), such as VHDL or Verilog. Following development of the initial design, physical design processes can be preformed in order to generate a design layout for the IC chip. These physical design processes can include, but are not limited to, logic synthesis, floorplanning, power planning and input/output pin placement, library element placement, clock tree synthesis and wire routing. Such physical design processes are well known in the art and, thus, the details of those processes are omitted form this specification in order to allow the reader to focus on the salient aspects of the disclosed method. The design layout for the IC chip can be stored in memory.

In the method, a design layout for a semiconductor wafer (on which multiple instances of the IC chip will be formed) can be developed (e.g., by a processor) and stored in memory (102).

Figure 2:
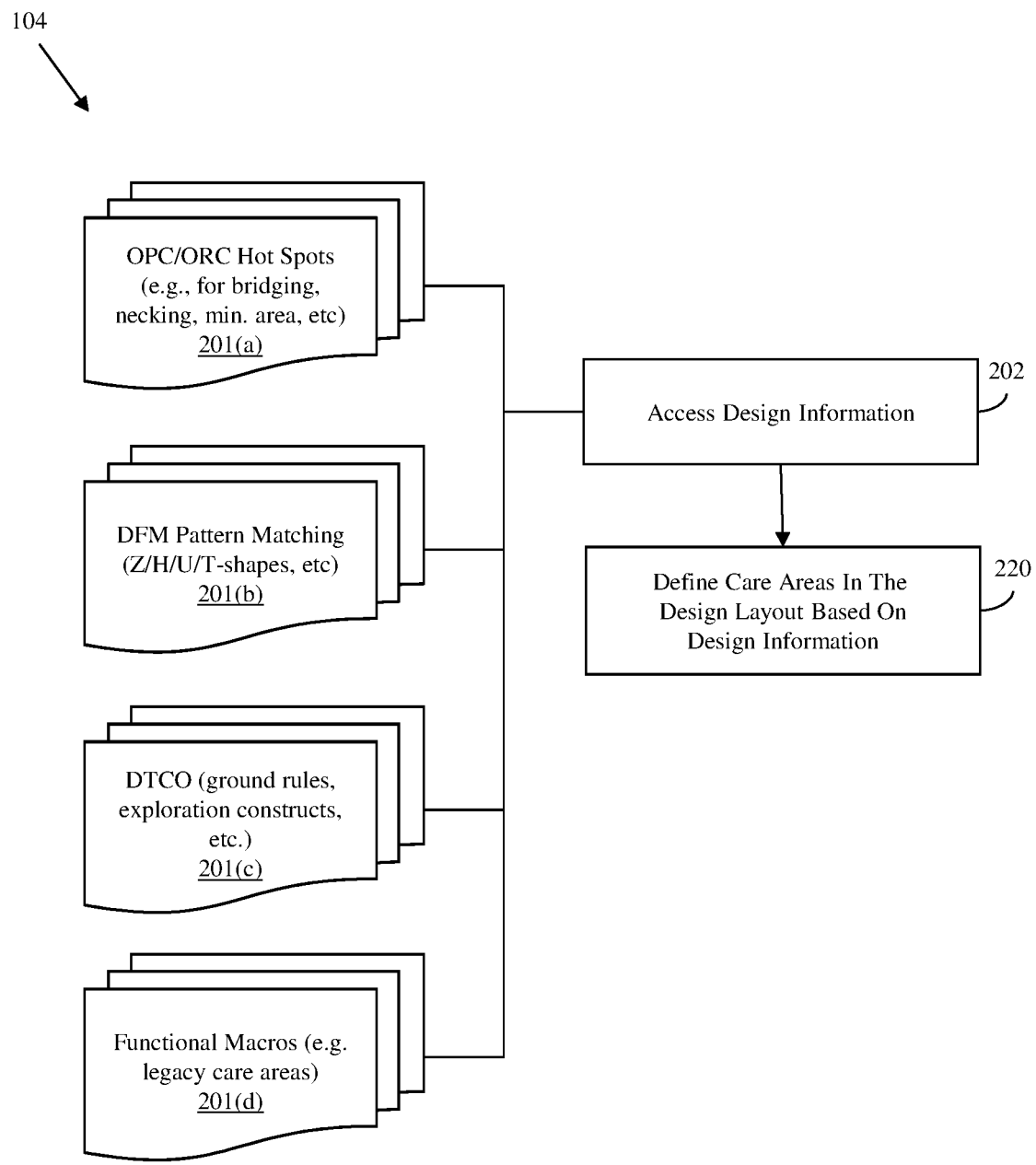
FIG. 2 is a diagram further illustrating process 104 of FIG. 1.

The design layout for the semiconductor wafer can subsequently be accessed (e.g., by the processor) and various inspection care areas (i.e., areas of interest) can be defined throughout this design layout (104). These inspection care areas can include, but are not limited to, entire IC chips on the semiconductor wafer or different portions of the IC chips on the semiconductor wafer. Although the inspection care areas can be any defined area on the semiconductor wafer, preferably the inspection care areas are defined based on the likelihood that they will contain a critical defect and/or on their importance with respect to yield. Thus, for example, referring to FIG. 2, the process 104 of defining inspection care areas in the design layout of the semiconductor wafer can involve accessing design information stored in memory (202) and defining the care areas in the design layout based on this design information (220). The design information used to define the inspection care areas can include, but is not limited to, any of the following: the results of optical rule checking (ORC) and optical proximity correction (OPC) processes 201(*a*) that identify "hot spots" for defects, such as bridging defects, necking defects, minimum area defects, etc.; the results of design for manufacturing (DFM) pattern matching 201(*b*) that identify patterned shapes (e.g., Z-shapes, H-shapes, U-shapes, T-shapes, etc.) that tend to exhibit defects; the results of design-technology co-optimization 201(*c*) that provide for ground rules, exploration constructs, etc. regarding patterned shapes and the neighborhood surrounding the patterned shapes (e.g., limits on dimensions, allowable variations, etc.); and locations of functional macros (i.e., functional blocks) 201(*d*), such as memory arrays, digital or analog circuits, etc. that are of particular importance to IC chip functioning.

Referring again to FIG. 1, after the inspection care areas are defined at process 104, the inspection care areas can be assigned (e.g., by the processor) to different care area groups based on different design properties (106). That is, each inspection care area defined at process 104 can be assigned to one of multiple different care area groups at process 106, based on the design properties present in that inspection care area. Thus, all the inspection care areas assigned to any particular care area group will have at least one similar design property, which is different from a design property in care areas in other groups. The design properties at issue are design properties known to impact what the optimal threshold setting for defect detection should be. For purposes of this disclosure, the optimal threshold setting for defect detection is that sensitivity threshold or inspection recipe used by a processor to detect defects in an optical image of an inspection care area captured by an optical inspection tool such that detection of false defects (e.g., wafer or system noise) or nuisance defects (e.g., actual defects identified as non-critical or not affecting yield) is minimized or avoided and such that failure to detect critical defects is also minimized or avoided. The different design properties used to group the inspection care areas into different care area groups can include, but are not limited to, different pattern density levels, different percentages of edges oriented in an x-direction and a y-direction, and different pattern complexity levels.

For purpose of this disclosure, the "pattern density" refers to the area fraction of exposed surface of a layer below the patterned layer (e.g., a patterned photoresist layer, a patterned hard mask layer, etc.) and the size of this area fraction may impact how dark or light optical images captured by an optical inspection tool appear. It should be noted that inspection care areas with high pattern density levels may appear relatively dark and inspection care areas with low pattern density levels may appear relatively light in optical images captured by the same optical inspection tool. Given the different appearances of the optical images due to the different pattern densities, the same threshold setting (i.e., the same inspection recipe) would not be optimal for detecting defects in both inspection care areas with high pattern density levels and inspection care areas with low pattern density levels.

For purposes of this disclosure, the "percentages of edges oriented in the x-direction and the y-direction" refers to the percentage of the overall length of the edges in the pattern that are oriented in the x-direction (i.e., horizontal direction) and the percentage of the overall length of the edges in the pattern that are oriented in the y-direction (i.e., vertical direction). It should be noted that printing can be more accurate when the edges of features in a pattern are primarily oriented in the x-direction as compared to the y-direction. Given the different probabilities of having defects, the same threshold setting (i.e., the same inspection recipe) would not be optimal for detecting defects in both inspection care areas with a higher percentage of edges in the x-direction than the y-direction and inspection care areas with a lower percentage of edges in the x-direction than the y-direction.

Finally, for purposes of this disclose, the "pattern complexity" refers to the number of vertices (i.e., corners) in the patterned shapes within the pattern. That is, a pattern with a relatively high number of vertices will have a relatively high pattern complexity level (i.e., will be considered more complex) and a pattern with a relatively low number of vertices with have a relatively low pattern complexity level (i.e., will be considered less complex). It should be noted inspection care areas with high pattern complexity levels will be associated with a greater number of "noise" sources than inspection care areas with low pattern complexity levels. Given that the different noise sources, the same threshold setting (i.e., the same inspection recipe) would not be optimal for detecting defects in both inspection care areas with high pattern complexity levels and inspection care areas with low pattern complexity levels.

Figure 3:
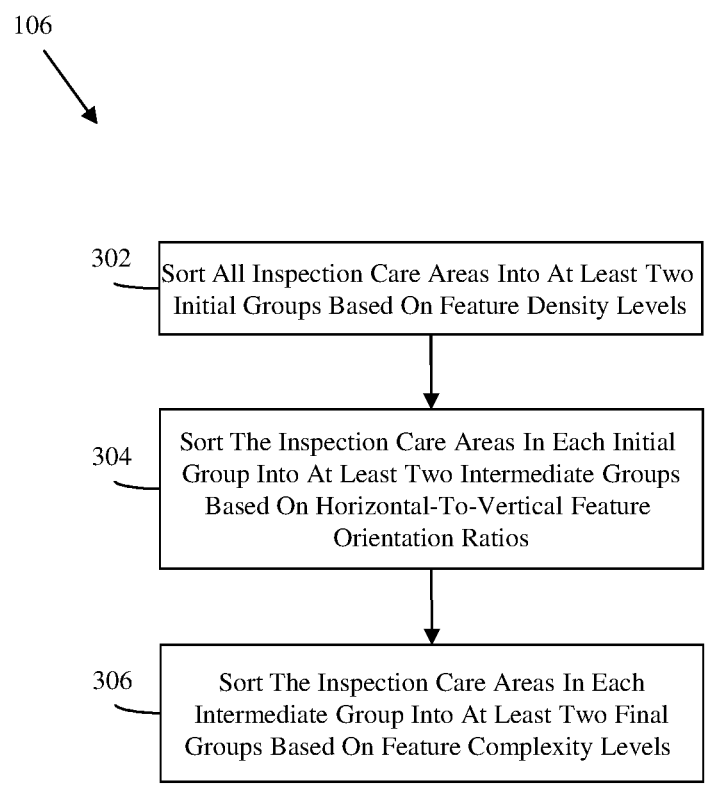
FIG. 3 is a diagram further illustrating process 106 of FIG. 1.

It should be noted that the inspection care areas could be sorted into at least two different care area groups based on a single one of any of the above-mentioned design properties. For example, the inspection care areas can be sorted into different care area groups having different pattern density levels alone, having different percentages of edges oriented in the x and y directions alone, or having different pattern complexity levels alone. Alternatively, as illustrated in the flow diagram of FIG. 3, the inspection care areas can be sorted at process 106 into multiple care area groups based on different combinations of these design properties. That is, the inspection care areas can be sorted into different combinations of different pattern density levels, different percentages of edges oriented in the x and y directions and different pattern complexity levels (see processes 302, 304 and 306, respectively).

Figure 4:
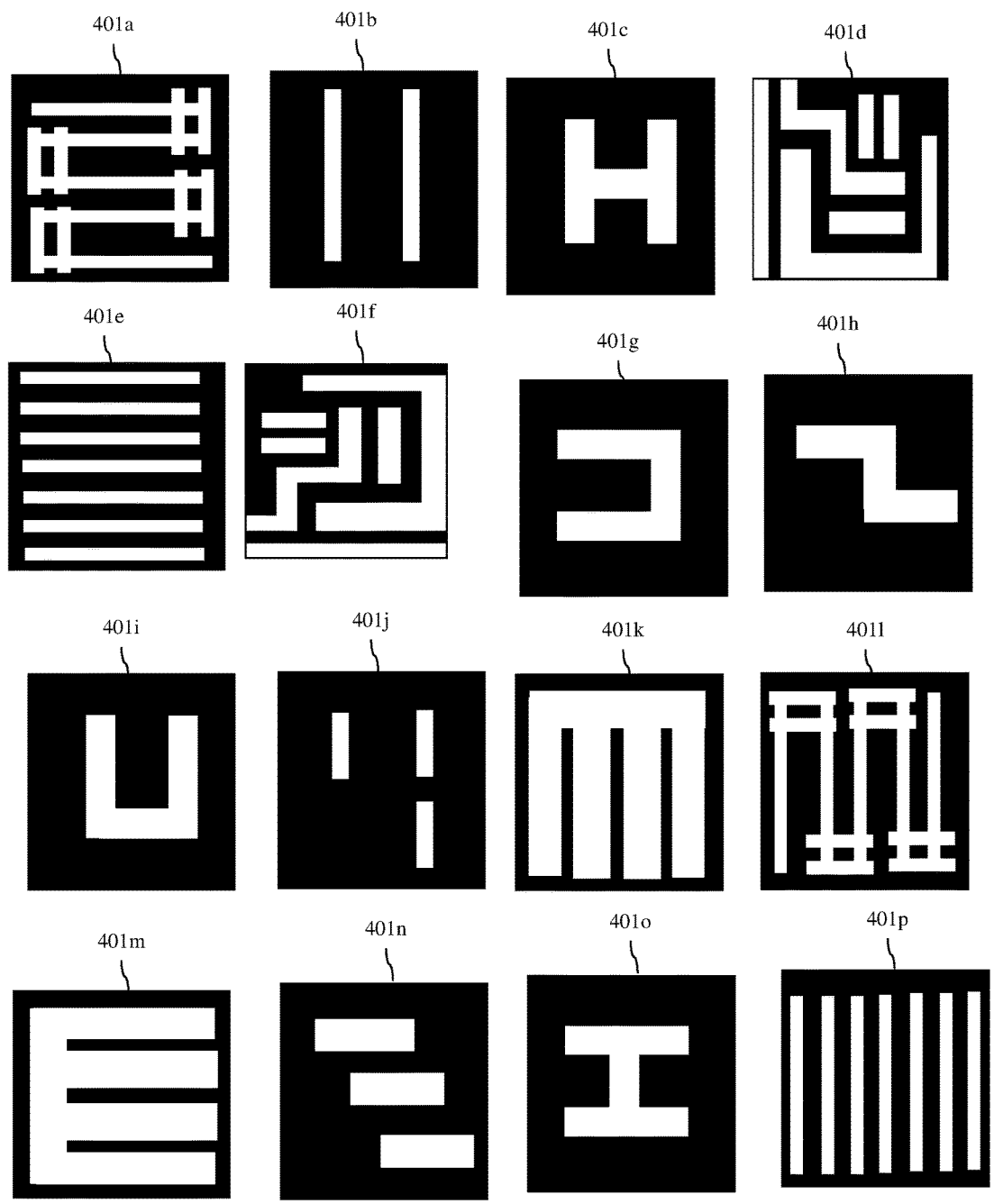
FIG. 4 illustrates exemplary inspection care areas.

More specifically, FIG. 4 illustrates patterned shapes in sixteen exemplary inspection care areas 401a-401p defined at process 104.

Figure 5:
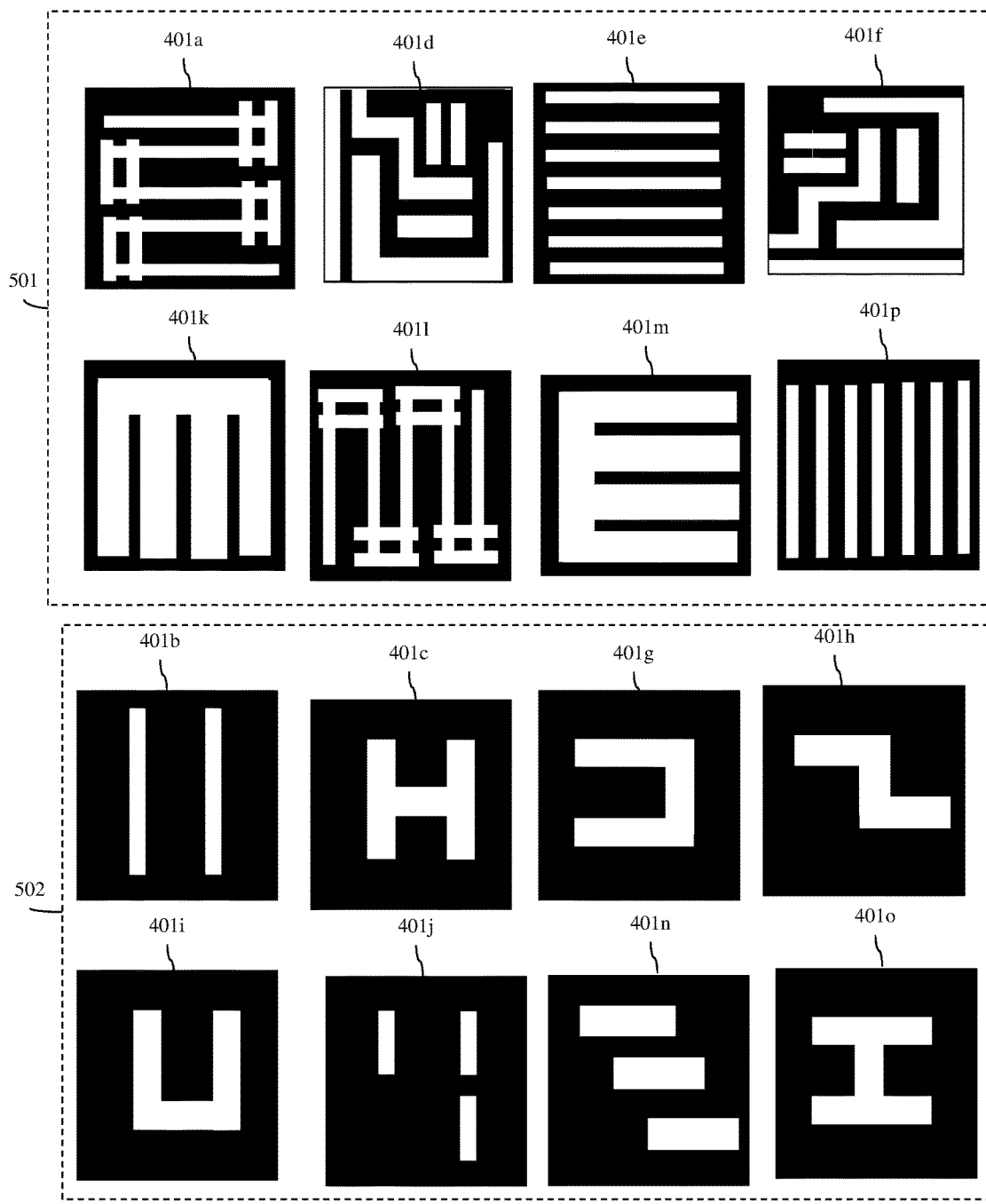
FIG. 5 illustrates the exemplary inspection care areas sorted based on pattern density.

At process 302, pattern density levels can be determined for the inspection care areas 401a-401p and, based on the pattern density levels, the inspection care areas 401a-401p can be sorted into multiple initial groups. FIG. 5 illustrates the inspection care areas 401a-401p sorted into two initial groups including a group 501 containing inspection care areas 401a, 401d, 401e, 401f, 401k, 401l, 401m and 401p having pattern density levels at or above a predetermined threshold pattern density level and a group 502 containing inspection care areas 401b, 401d, 401g, 401h, 401i, 401j, 401n and 401o having pattern density levels below the predetermined threshold pattern density level. It should be noted that, if the inspection care areas are to be sorted into more than two initial groups, different ranges of pattern density levels can be associated with each initial group.

Figure 6:
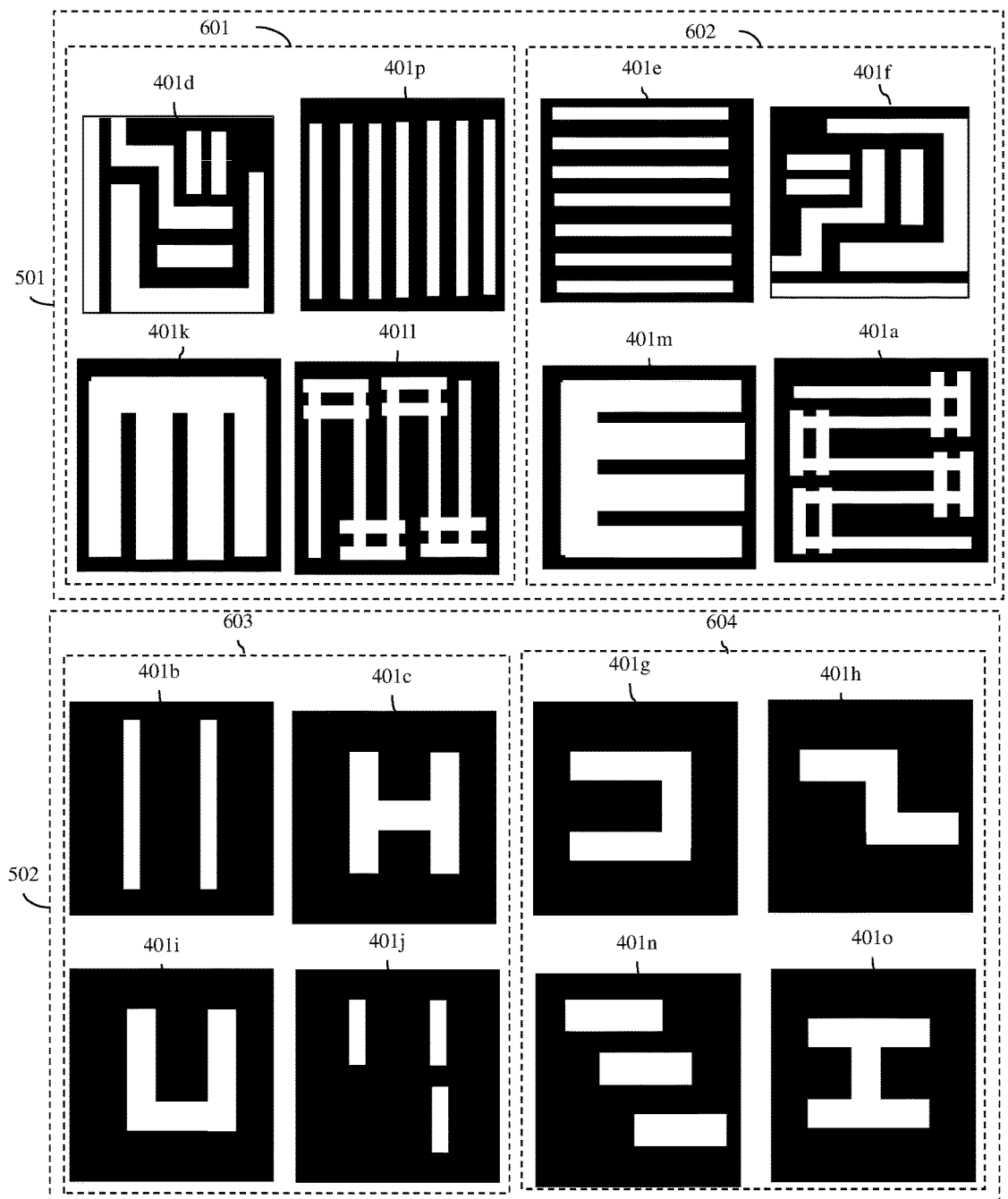
FIG. 6 illustrates the exemplary inspection care areas further sorted based on percentages of edges oriented in the x-direction and the y-direction.

At process 304, percentages of edges oriented in the x-direction and the y-direction can be determined for each of the inspection care areas 401a-401p and, based on these percentages, the inspection care areas in each initial group can be sorted into at least two intermediate groups. FIG. 6 illustrates the inspection care areas 401a, 401d, 401e, 401f, 401k, 401l, 401m and 401p in the initial group 501 sorted into at least two intermediate groups including intermediate groups 601 and 602. Intermediate group 601 can contain inspection care areas 401d, 401k, 401l and 401p, each having a majority of edges oriented in the y-direction, and intermediate group 602 can contain inspection care areas 401a, 401e, 401f, and 401m, each having a majority of edges oriented in the x-direction. FIG. 6 also illustrates the inspection care areas 401b, 401d, 401g, 401h, 401i, 401j, 401n and 401o in the initial group 502 sorted into at least two intermediate groups including an intermediate group 603 containing inspection care areas 401b, 401c, 401i and 401j, each having a majority of edges oriented in the y-direction and an intermediate group 604 containing inspection care areas 401g, 401h, 401n, and 401o, each having a majority of edges oriented in the x-direction. It should be noted that, if the inspection care areas in any given initial group are to be sorted into more than two intermediate groups based on percentages of edges oriented in the x-direction and the y-direction, different ranges of the percentages can be associated with each intermediate group.

Figure 7:
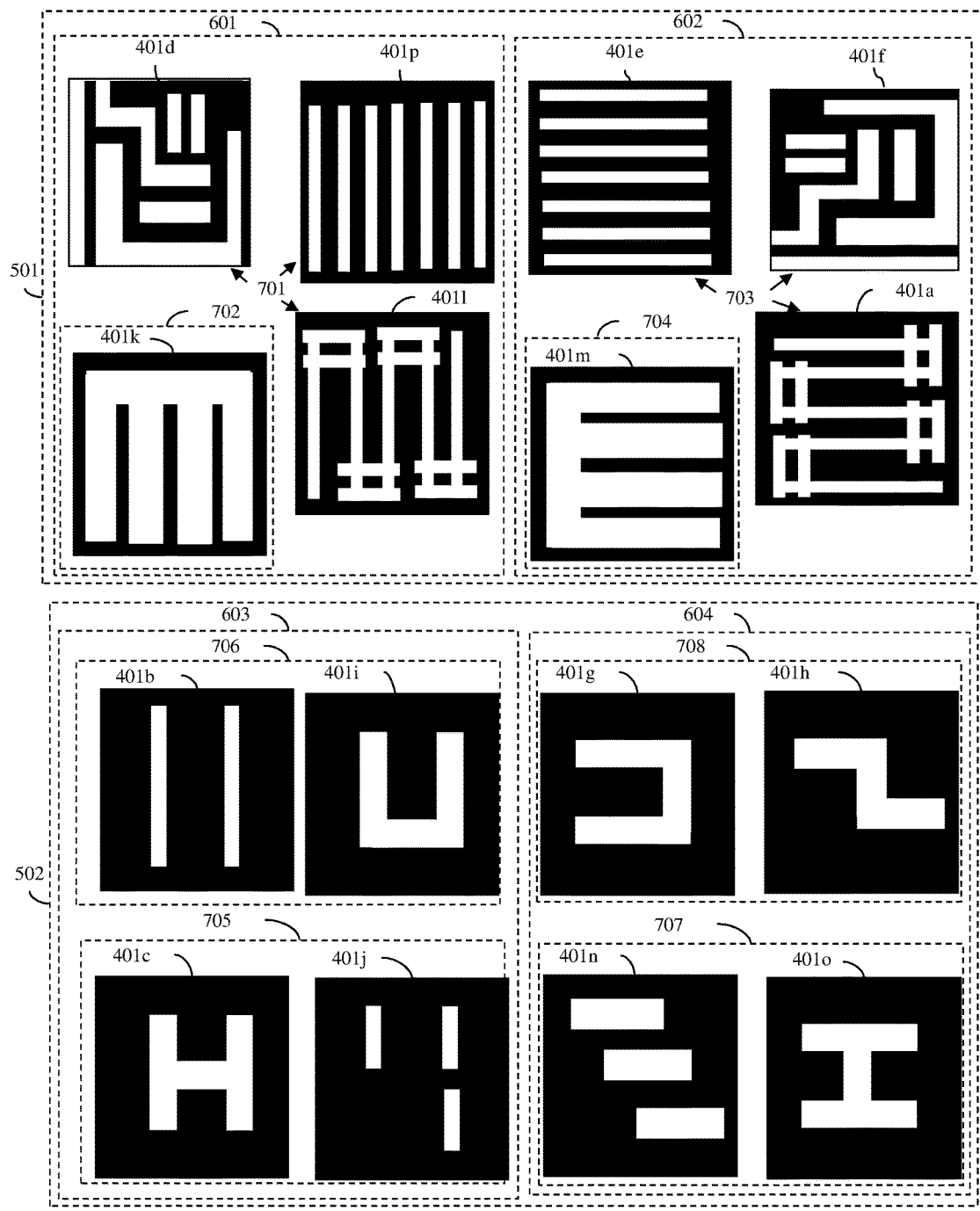
FIG. 7 illustrates the exemplary inspection care areas further sorted based on pattern complexity levels.

Finally, at process 306, pattern complexity levels can also be determined for each of the inspection care areas 401a-401p and, based on the pattern complexity levels, the inspection care areas in each intermediate group can be sorted into at least two final groups. FIG. 7 illustrates the inspection care areas 401d, 401k, 401l and 401p in the intermediate group 601 sorted into at least two final groups 701 and 702, where the final group 701 contains inspection care areas 401d, 401l and 401p, each having a pattern complexity level at or above a first predetermined pattern complexity level (e.g., each having at least a first predetermined number of vertices), and where the final group 702 contains inspection care area 401k having a pattern complexity level below the first predetermined pattern complexity level. FIG. 7 also illustrates the inspection care areas 401e, 401f, 401m and 401a in the intermediate group 602 sorted into at least two final groups 703 and 704, where the final group 703 contains inspection care areas 401e, 401f and 401a, each having a pattern complexity level at or above the first predetermined pattern complexity level, and where the final group 704 contains inspection care area 401m having a pattern complexity level below the first predetermined pattern complexity level. FIG. 7 also illustrates the inspection care areas 401b, 401i, 401c and 401j in the intermediate group 603 sorted into at least two final groups 705 and 706, where the final group 705 contains inspection care areas 401c and 401j, each having a pattern complexity level at or above a second predetermined pattern complexity level that is lower than the first predetermined pattern complexity level (e.g., each having at least a second predetermined number of vertices that is lower than the first predetermined number), and where the final group 706 contains inspection care areas 401b and 401i, each having a pattern complexity level below the second predetermined pattern complexity level. Finally, FIG. 7 also illustrates inspection care areas 401g, 401h, 401n and 401o in the intermediate group 604 sorted into at least two final groups 707 and 708, where the final group 707 contains inspection care areas 401n and 401o, each having a pattern complexity level at or above the second predetermined pattern complexity level, and where the final group 708 contains inspection care areas 401g and 401h having a pattern complexity level below the second predetermined pattern complexity level. It should be noted that, if the inspection care areas in any given intermediate group are to be sorted into more than two final groups based on pattern complexity levels, different ranges of the pattern complexity levels can be associated with each intermediate group.

Referring again to FIG. 1, for each given care area group, a corresponding threshold setting (i.e., the inspection recipe or sensitivity threshold) that is optimal for detecting defects in any of the inspection care areas sorted into that given care area group can be determined (e.g., by the processor) (108). The corresponding threshold setting that is optimal for detecting defects in the inspection care areas from a given care area group can be determined at process 108 based on the design properties associated with that given care area group. For example, given the exemplary inspection care area groupings shown in FIG. 7, all of the inspection care areas in the final group 701 can have the highest threshold setting (Level 1) because the inspection care areas in the final group 701 have a high pattern density level, a high percentage of y-direction edges and a pattern complexity level at or above the first predetermined pattern complexity level. All of the inspection care areas in the final group 702 can have the next highest threshold setting (Level 2) because the inspection care areas in the final group 702 have a high pattern density level, a high percentage of y-direction edges, and a pattern complexity level below the first predetermined pattern complexity level. All the inspection care areas in the final group 703 can have the next highest threshold setting (Level 3) because the inspection care areas in the final group 703 have a high pattern density level, a low percentage of y-direction edges and a pattern complexity level at or above the first predetermined pattern complexity level. All the inspection care areas in the final group 704 can have the next highest threshold setting (Level 4) because the inspection care areas in the final group 704 have a high pattern density level, a low percentage of y-direction edges and a pattern complexity level below the first predetermined pattern complexity level. All the inspection care areas in the final group 705 can have the next highest threshold setting (Level 5) because the inspection care areas in the final group 705 have a low pattern density level, a high percentage of y-direction edges and a pattern complexity level at or above the second predetermined pattern complexity level. All the inspection care areas in the final group 706 can have the next highest threshold setting (Level 6) because the inspection care areas in the final group 706 have a low pattern density level, a high percentage of y-direction edges and a pattern complexity level below the second predetermined pattern complexity level. All the inspection care areas in the final group 707 can have the next highest threshold setting (Level 7) because the inspection care areas in the final group 705 have a low pattern density level, a low percentage of y-direction edges and a pattern complexity level at or above the second predetermined pattern complexity level. All the inspection care areas in the final group 708 can have the lowest threshold setting (Level 8) because the inspection care areas in the final group 708 have a low pattern density level, a low percentage of y-direction edges and a pattern complexity level below the second predetermined pattern complexity level.

Techniques used to determine the different threshold settings that are optimal for detecting defects in the different care area groups can be essentially the same techniques as those known in the art for determining the threshold settings for specific inspection care areas, individually. In this case, however, to determine the corresponding threshold setting for a specific care area group, one of the inspection care areas in the specific care area group can be selected. The threshold setting that is optimal for detecting defects in the selected inspection care area can be determined using techniques known in the art (e.g., by manually and/or automatically processing results acquired from optical inspections of test semiconductor wafers by the optical inspection tool). Then, the threshold setting determined for the selected inspection care area can be associated with all of the inspection care areas in the specific care area group. It should be noted that selection of the inspection care area from the specific care area group can be random. Alternatively, the selection of the inspected care area can be systematic (e.g., the selected inspection care area can be that care area in the specific care area with the greatest pattern density level, the greatest number of vertically oriented edges and/or the greatest pattern complexity level) to ensure that the threshold setting associated with the specific care area group is optimized for best signal-to-noise ratio for defect detection across the inspection care areas in the specific care area group. It should be understood that the threshold settings and techniques used to determine them may vary depending upon the type of optical inspection tool used for the optical inspections.

Based on the results of processes 102-108, an index (or map) of the inspection care areas on the semiconductor wafer can be generated (e.g., by a processor) and stored in a memory (110). FIG. 8 illustrates an exemplary index that can be generated at process 110. This index can, for example, list the defined inspection care areas by identifiers and can indicate the location on the semiconductor wafer of those defined care areas (e.g., by coordinates (not shown)). This index can further indicate the different care area groups to which the inspection care areas were assigned at process 106. That is, for each specific care area listed in the index, the index can also indicate the specific care area group to which that specific care area was assigned. The index can further associate the different care area groups with the different threshold settings, respectively, which are optimal for detecting defects and which are determined at process 108. That is, for each specific care area group referenced in the index, the index can further associate the specific care area group with its corresponding threshold setting (i.e., corresponding inspection recipe or sensitivity threshold).

Subsequently, manufacturing of semiconductor wafers according to the design layout developed at process 102 can be initiated (112).

During semiconductor wafer manufacturing, the inspection care areas that were defined at process 104 can be inspected by an optical inspection tool of an inspection system (114). Specifically, an optical inspection tool can capture optical images of the inspection care areas. Such an optical inspection tool can be, for example, a dark field inspection tool, a bright field inspection tool, or any other suitable optical inspection tool known in the art.

These optical images can be received and analyzed by a processor of the inspection system to detect defects in the inspection care areas (116). Specifically, during optical image analysis at process 116, the index generated at process 110 can be accessed by the processor from the memory and used such that each inspection care area and, more particularly, each optical image of each inspection care area belonging to a specific care area group is analyzed based on a corresponding threshold setting associated in the index with that specific care area group. The use of the care area group-specific threshold settings for detecting defects as opposed to a single threshold setting for all inspection care areas minimizes detection of false defects (e.g., due to wafer or system noise) or nuisance defects (e.g., actual defects identified as non-critical or not affecting yield) and also minimizes any failure to detect critical defects. Furthermore, by using such group-specific threshold settings for detecting defects as opposed to care area-specific threshold settings for detecting defects significantly reduces costs, in terms of time and resources, associated with determining the care area-specific threshold settings.

Optionally, the different care area groups in the index can be ranked (118). Specifically, the various defects of interest that can be detected at process 116 can be ranked based on their respective probability of impacting yield. That is, a high ranked defect will have a relatively high probability of impacting yield, whereas a low ranked defect will have a relatively low probability of impacting yield. A catastrophic defect is a defect that has the highest probability of impacting yield and, thus, detecting such defects is of the utmost importance. Factors that can be considered in weighting defects for ranking purposes can include, but are not limited to, regions on the semiconductor wafer (e.g., defects in functional regions may be given a higher weight for ranking purposes than defects in design-for-experiment (DOE) regions), type of defect (e.g., sub-resolution assist feature (SRAF) defects may be given a higher weight for ranking purposes that minimum area defects), etc. Once the defects of interest are ranked, the care area groups defined at process 106 can be ranked based on their respective probability of containing inspection care areas having high ranked defects. If such ranking is performed, the index generated at process 110 can further indicate the care area group ranks (not shown).

Subsequently, a sample of the inspection care areas can be selected and further inspected by a scanning electron-beam microscope (SEM) to capture SEM images of at least some of the defects detected at process 116 (120). The sample of inspection care areas can, for example, be selected randomly. Alternatively, if the different care area groups have been ranked at process 118, the sample of the inspection care areas can be selected based on the results of the ranking process. For example, a greater proportion of the inspection care areas in the sample can be selected from high ranked care area groups as opposed to low ranked care area groups. The SEM images can then be analyzed in order to classify the detected defects by type (e.g., SRAF defects, minimum area defects, etc.).

The results of the inspections and, particularly, the results of the analyses of the optical images at process 116 and also the results of the analyses of the SEM images at process 120 can be used during wafer-level dispositioning (122). Specifically, wafer-level dispositioning refers determining whether a semiconductor wafer passes inspection and, thus, can be processed further (e.g., at higher mask levels, into chip modules, etc.) or fails and, thus, is scrapped. Additionally, at process 122 the results of the inspections can be used as inputs for adjusting the IC chip design layout and/or the semiconductor wafer design layout in order to avoid manufacturing IC chips with defects and, particularly, to avoid manufacturing IC chips with defects that impact yield.

Figure 9:
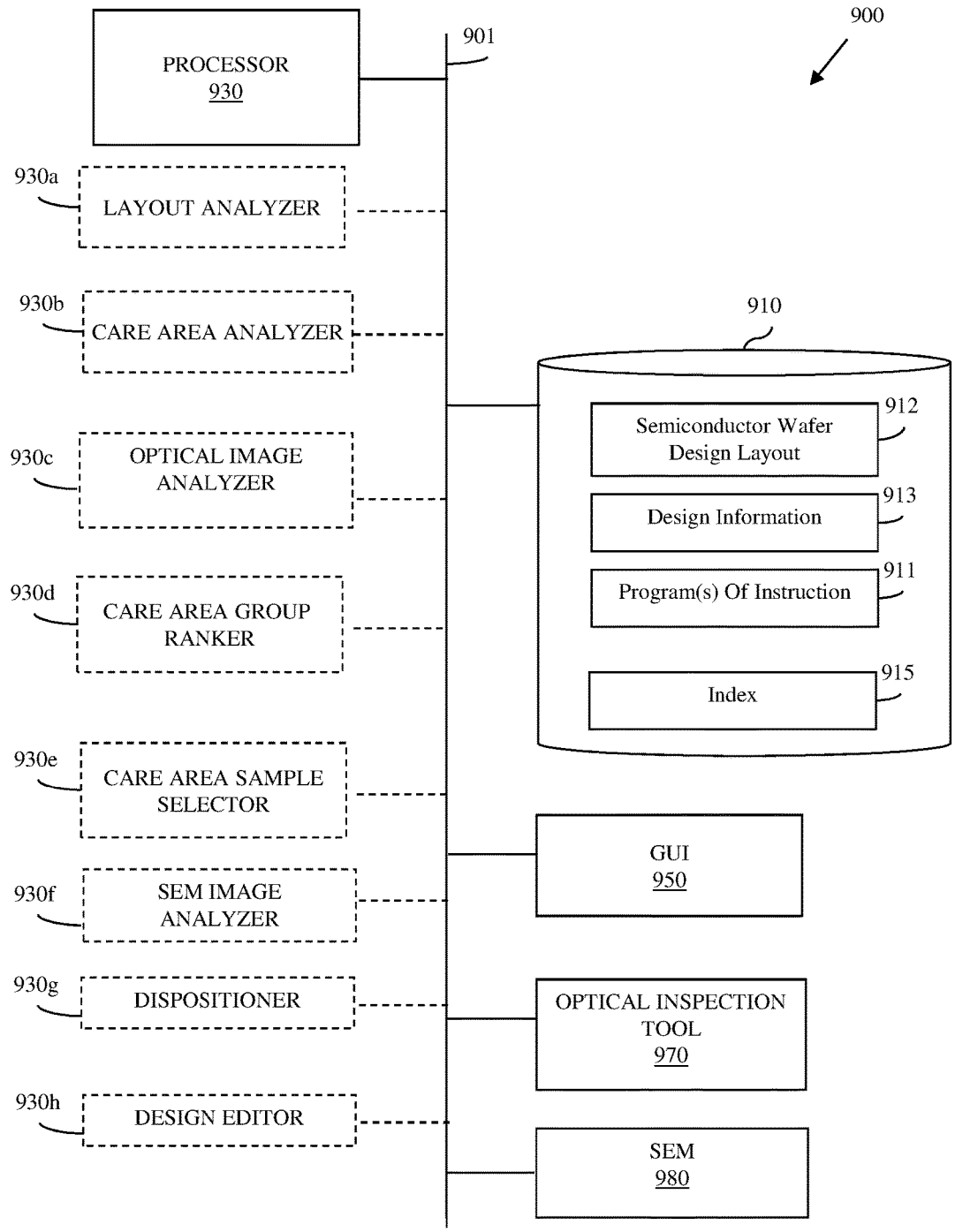
FIG. 9 is a schematic diagram illustrating an inspection system that can be used during integrated circuit chip design and fabrication.

Referring to FIG. 9, also disclosed herein is an inspection system that can be used during integrated circuit chip design and fabrication.

The inspection system 900 can incorporate at least one memory 910 (e.g., at least one computer readable storage medium, such as a computer readable storage device), a user interface 950 (e.g., a graphic user interface (GUI)), at least one processor (e.g., 930 or 930a-930h, see detailed discussion below), an optical inspection tool 970, and a scanning electron-beam microscope (SEM) 980. Components of the inspection system 900, including the processor(s), memory(ies), GUI, optical inspection tool and SEM can be interconnected over a system bus 901, as illustrated. Alternatively, any one or more of the components of the inspection system can communicate with any other component over a wired or wireless network.

The at least one processor can be a single specialized processor 930 (e.g., a single specialized computer processing unit) that, during IC design, performs (i.e., that is adapted to perform, that is configured to perform and/or that executes program(s) of instructions to perform) multiple process steps, as described in detail below. Alternatively, the at least one processor can be multiple specialized processors 930a-930h (e.g., multiple different specialized computer processing units) and, during IC design, each processor can perform (e.g., can be adapted to perform, can be configured to perform and/or can execute one or more specific program(s) of instructions to perform) one or more of the multiple process steps, as described in detail below. For purposes of illustration, eight different special purpose processors are shown in FIG. 9 including a semiconductor wafer design layout analyzer 930a, a care area analyzer 930b, an optical image analyzer 930c, a care area group ranker 930d, a care area sample selector 930e, a SEM image analyzer 930f, a wafer-level dispositioner 930g and an IC chip and/or semiconductor wafer design editor 930h. However, it should be understood that FIG. 9 is not intended to be limiting and, alternatively, the multiple process steps, as described in detail below, can be performed by any number of one or more processors.

The memory 910 can store the program(s) 911 of instructions referenced above and described in greater detail below. The memory 910 can further store a design layout 912 for a semiconductor wafer having multiple instances of an integrated circuit (IC) chip. As mentioned above, an initial design for the IC chip can be developed by a designer. Following development of the initial design, physical design processes can be preformed in order to generate a design layout for the IC chip. The design layout for the IC chip can subsequently be used to develop a design layout for a semiconductor wafer (on which multiple instances of the IC chip will be formed). The memory 910 can further store other design information 913 (discussed in greater detail below).

The processor 930 (or, if applicable, the semiconductor wafer design layout analyzer 930a)) can access and analyze (e.g., can be adapted to access and analyze, can be configured to access and analyze, can execute a program 911 of instructions to access and analyze, etc.) the semiconductor wafer design layout 912 in order to define, throughout this design layout 912, various different inspection care areas. These inspection care areas can include, but are not limited to, entire IC chips on the semiconductor wafer or different portions of the IC chips on the semiconductor wafer. Although the care areas can be any defined area on the semiconductor wafer, preferably the care areas are defined based on the likelihood that they will contain a critical defect and/or on their importance with respect to yield. Thus, for example, referring to FIG. 2, the process of defining inspection care areas in the design layout 912 can involve accessing design information 913 stored in memory and defining the inspection care areas in the design layout 912 based on this design information 913. The design information 913 used to define the inspection care areas can include, but is not limited to, any of the following: the results of optical rule checking (ORC) and optical proximity correction (OPC) processes 201(a) that identify "hot spots" for defects, such as bridging defects, necking defects, minimum area defects, etc.; the results of design for manufacturing (DFM) pattern matching 201(b) that identify patterned shapes (e.g., Z-shapes, H-shapes, U-shapes, T-shapes, etc.) that tend to exhibit defects; the results of design-technology co-optimization 201(c) that provide for ground rules, exploration constructs, etc. regarding patterned shapes and the neighborhood surrounding the patterned shapes (e.g., limits on dimensions, allowable variations, etc.); and locations of functional macros (i.e., functional blocks) 201(d), such as memory arrays, digital or analog circuits, etc. that are of particular importance to IC chip functioning.

The processor 930 (or, if applicable, the care area analyzer 930b) can assign (e.g., can be adapted to assign, can be configured to assign, can execute a program 911 of instructions to assign, etc.) the previously defined inspection care areas into different care area groups based on different design properties. Thus, all the care areas assigned to any particular care area group will have at least one similar design property, which is different from the care areas in other groups. The design properties at issue are design properties known to impact what the optimal threshold setting for defect detection should be. For purposes of this disclosure, the optimal threshold setting for defect detection is that sensitivity threshold or inspection recipe used by a processor to detect defects in an optical image of an inspection care area captured by an optical inspection tool such that detection of false defects (e.g., wafer or system noise) or nuisance defects (e.g., actual defects identified as non-critical or not affecting yield) is minimized or avoided and such that failure to detect critical defects is also minimized or avoided. The different design properties used to group the inspection care areas into different care area groups can include, but are not limited to, different pattern density levels, different percentages of edges oriented in an x-direction and a y-direction, and different pattern complexity levels, as discussed in greater detail above with regard to process 106 of FIG. 1.

It should be noted that the inspection care areas can be sorted into at least two different care area groups based on a single one of any of the above-mentioned design properties. For example, the inspection care areas can be sorted into different care area groups having different pattern density levels alone, having different percentages of edges oriented in the x and y directions alone, or having different pattern complexity levels alone. Alternatively, as illustrated in the flow diagram of FIG. 3, the inspection care areas can be sorted into multiple care area groups based on different combinations of these design properties. That is, the inspection care areas can be sorted into different combinations of different pattern density levels, different percentages of edges oriented in the x and y directions and different pattern complexity levels (see processes 302, 304 and 306, respectively).

More specifically, FIG. 4 illustrates patterned shapes in sixteen exemplary inspection care areas 401a-401p. The processor 930 (or, if applicable, the care area analyzer 930b) can determine the pattern density levels for the inspection care areas 401a-401p and, based on the pattern density levels, the inspection care areas 401a-401p can be sorted into multiple initial groups (e.g., initial groups 501 and 502), as shown in FIG. 5 and discussed in greater detail above with regard to process 302 of FIG. 3. The processor 930 (or, if applicable, the care area analyzer 930b) can further determine percentages of edges oriented in the x-direction and the y-direction for each of the inspection care areas 401a-401p and, based on these percentages, can sort the inspection care areas in each initial group into at least two intermediate groups. For example, inspection care areas in initial group 501 can be sorted into intermediate groups 601 and 602 and inspection care areas in initial group 502 can be sorted into intermediate groups 603 and 604, as shown in FIG. 6 and discussed in greater detail above with regard to process 304 of FIG. 3. The processor 930 (or, if applicable, the care area analyzer 930b) can further determine the pattern complexity levels for each of the inspection care areas 401a-401p and, based on the pattern complexity levels, can sort the inspection care areas in each intermediate group into at least two final groups. For example, inspection care areas in intermediate group 601 can be sorted into final groups 701 and 702, inspection care areas in intermediate groups 602 can be sorted into final groups 703 and 704, inspection care areas in intermediate group 603 can be sorted into final groups 705 and 706 and inspection care areas in intermediate group 604 can be sorted into groups 707 and 708, as shown in FIG. 7 and discussed in greater detail above with regard to process 306 of FIG. 3.

Additionally, the processor 930 (or, if applicable, the care area analyzer 930b) can determine (e.g., can be adapted to determine, can be configured to determine, can execute a program 911 of instructions to determine, etc.), for each given care area group, a corresponding threshold setting that is optimal for detecting defects in any of the inspection care areas sorted into that given care area group. As discussed in greater detail above with regard to process 108 of FIG. 1, the threshold setting that is optimal for detecting defects in the inspection care areas from a given care area group can be determined based on the design properties associated with that given care area group. Techniques used to determine the different threshold settings that are optimal for detecting defects in the different care area groups can be essentially the same techniques as those known in the art for determining the threshold settings for specific inspection care areas, individually. In this case, however, to determine the corresponding threshold setting for a specific care area group, one of the inspection care areas in the specific care area group can be selected. The threshold setting that is optimal for detecting defects in the selected inspection care area can be determined using techniques known in the art (e.g., by manually and/or automatically processing results acquired from optical inspections of test semiconductor wafers by the optical inspection tool). Then, the threshold setting determined for the selected inspection care area can be associated with all of the inspection care areas in the specific care area group. It should be noted that selection of the inspection care area from the specific care area group can be random. Alternatively, the selection of the inspected care area can be systematic (e.g., the selected inspection care area can be that care area in the specific care area with the greatest pattern density level, the greatest number of vertically oriented edges and/or the greatest pattern complexity level) to ensure that the threshold setting associated with the specific care area group is optimized for best signal-to-noise ratio for defect detection across the inspection care areas in the specific care area group. It should be understood that the threshold settings and techniques used to determine them may vary depending upon the type of optical inspection tool used for the optical inspections.

The processor 930 (or, if applicable, the care area analyzer 930b) can further generate and store in memory 910 (e.g., can be adapted to generate, can be configured to generate, can execute a program 911 of instructions to generate, etc.) an index 915 (or map) of the inspection care areas on the semiconductor wafer. For example, as illustrated in FIG. 8 and discussed in greater detail above with regard to process 110 of FIG. 1, this index can, for example, list the defined care areas by identifiers and can indicate the location on the semiconductor wafer of those defined care areas (e.g., by coordinates (not shown)). This index can further indicate the different care area groups to which the inspection care areas were assigned. That is, for each specific inspection care area listed in the index, the index can also indicate the specific care area group to which that specific inspection care area was assigned. The index can further associate the different care area groups with their corresponding threshold settings. That is, for each specific care area group referenced in the index, the index can further associated the specific care area group with its corresponding threshold setting that is optimal for detecting defects in any of the inspection care areas sorted into that specific care area group.

Manufacturing of semiconductor wafers according to the design layout can then be initiated and, during manufacturing, inspection of the inspection care areas can be performed by the optical inspection tool 970 in order to capture optical images of the inspection care areas. Such an optical inspection tool 970 can be, for example, a dark field inspection tool, a bright field inspection tool, or any other suitable optical inspection tool known in the art.

The processor 930 (or, if applicable, the optical image analyzer 930c) can analyze (e.g., can be adapted to analyze, can be configured to analyze, can execute a program 911 of instructions to analyze, etc.) the optical images of the inspection care areas captured by the optical inspection tool 970 in order to detect defects in those inspection care areas. Specifically, during optical image analysis, the processor 930 (or, if applicable, the optical image analyzer 930c) can access the index 915 from the memory 910 and use that index 915 such that each inspection care area and, more particularly, each optical image of each inspection care area belonging to a specific care area group is analyzed based on a corresponding threshold setting associated in the index 915 with that specific care area group. The use of the care area group-specific threshold settings for detecting defects as opposed to a single threshold setting for all inspection care areas minimizes detection of false defects (e.g., due to wafer or system noise) or nuisance defects (e.g., actual defects identified as non-critical or not affecting yield) and also minimizes any failure to detect critical defects. Furthermore, by using such group-specific threshold settings for detecting defects as opposed to care area-specific threshold settings for detecting defects significantly reduces costs, in terms of time and resources, associated with determining the care area-specific threshold settings.

Optionally, the processor 930 (or, if applicable, the care area group ranker 930d) can rank (e.g., can be adapted to rank, can be configured to rank, can execute a program 911 of instructions to rank, etc.) the different care area groups in the index. Specifically, the various defects of interest that can be detected in the inspection care areas can be ranked based on their respective probability of impacting yield. That is, a high ranked defect will have a relatively high probability of impacting yield, whereas a low ranked defect will have a relatively low probability of impacting yield. A catastrophic defect is a defect that has the highest probability of impacting yield and, thus, detecting such defects is of the utmost importance. Factors that can be considered in weighting defects for ranking purposes can include, but are not limited to, regions on the semiconductor wafer (e.g., defects in functional regions may be given a higher weight for ranking purposes than defects in design-for-experiment (DOE) regions), type of defect (e.g., sub-resolution assist feature (SRAF) defects may be given a higher weight for ranking purposes that minimum area defects), etc. Once the defects of interest are ranked, the different care area groups can be ranked based on their respective probability of containing inspection care areas having high ranked defects. If such ranking is performed, the index 915 generated, as discussed above, can further indicate the care area group ranks (not shown).

Subsequently, the processor 930 (or, if applicable, the care area sample selector 930e) can select (e.g., can be adapted to select, can be configured to select, can execute a program 911 of instructions to select, etc.) a sample of the inspection care areas and the SEM 980 can further inspect the inspection care areas in the sample to capture SEM images of at least some of the previously detected defects. The sample of inspection care areas can, for example, be selected randomly. Alternatively, if the different care area groups have been ranked at process 118, the sample of the inspection care areas can be selected based on the results of the ranking process. For example, a greater proportion of the inspection care areas in the sample can be selected from high ranked care area groups as opposed to low ranked care area groups. The processor 930 (or, if applicable, the SEM image analyzer 930f) can analyze (e.g., can be adapted to analyze, can be configured to analyze, can execute a program 911 of instructions to analyze, etc.) the SEM images in order to classify the detected defects by type (e.g., SRAF defects, minimum area defects, etc.).

The processor 930 (or, if applicable, the wafer-level dispositioner 930g) can disposition (e.g., can be adapted to disposition, can be configured to disposition, can execute a program 911 of instructions to disposition, etc.) the manufactured semiconductor wafers based on the results of the inspections and, particularly, the results of the analyses of the optical images from the optical inspection tool and also the results of the analyses of the SEM images from the SEM. Specifically, wafer-level dispositioning refers determining whether a semiconductor wafer passes inspection and, thus, can be processed further (e.g., at higher mask levels, into chip modules, etc.) or fails and, thus, is scrapped. Additionally, the processor 930 (or, if applicable, the design editor 930h) can use (e.g., can be adapted to use, can be configured to use, can execute a program 911 of instructions to use, etc.) the results of the inspections as inputs for adjusting the IC chip design layout and/or the semiconductor wafer design layout in order to avoid manufacturing IC chips with defects and, particularly, to avoid manufacturing IC chips with defects that impact yield.

Also disclosed herein is a computer program product. This computer program product can be a computer readable storage medium having program instructions embodied therewith. The program instructions can be executable by a processor to cause the processor to perform an inspection method that can be used during integrated circuit chip fabrication, as described above. More particularly, the present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may incorporate copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein is an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which include one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
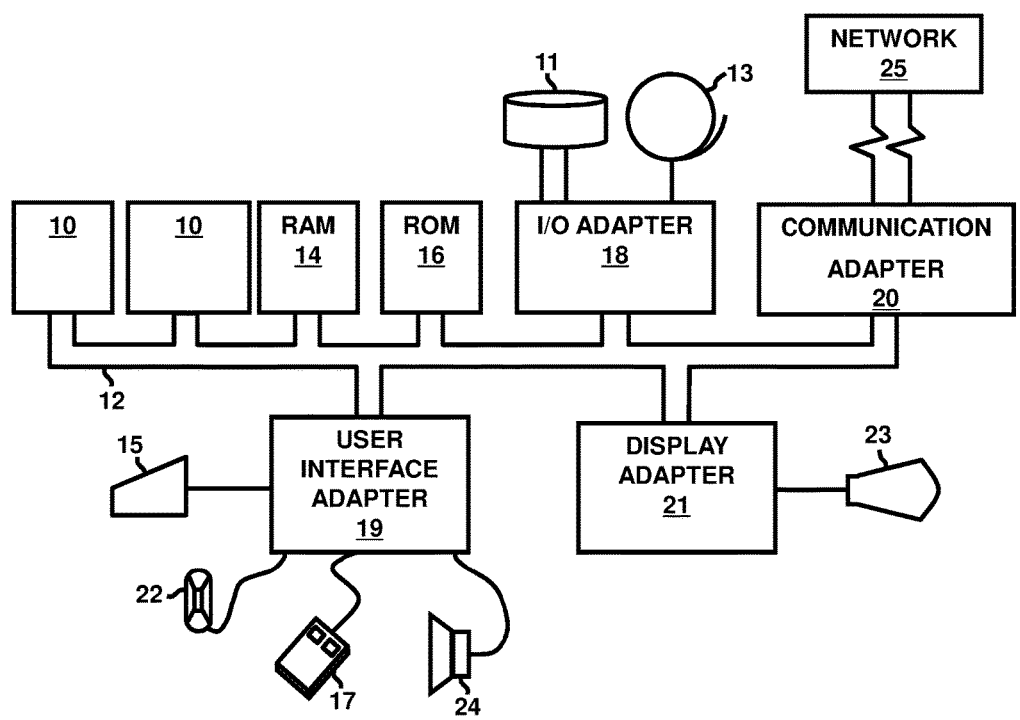
FIG. 10 is a schematic diagram illustrating a representative hardware environment (i.e., a representative computer system) for implementing the disclosed method, system and computer program product.

A representative hardware environment (i.e., a computer system) for implementing the method, system and computer program product described above is depicted in FIG. 10. This schematic drawing illustrates a hardware configuration of an information handling/computer system in accordance with the embodiments herein. The system incorporates at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed method, system and computer program product and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Disclosed above are inspection methods and systems that can be used during integrated circuit chip design and fabrication. In the methods and systems, optical images of previously defined inspection care areas on a semiconductor wafer can be acquired and analyzed to detect defects. However, during the analysis of the optical images, the inspection methods and systems do not use the same threshold setting for detecting defects in all of the inspection care areas. Instead, the inspection care areas can be grouped into different care area groups, based on different design layouts and properties (e.g., different combinations of design properties). Each different care area group can be associated with a corresponding threshold setting that is optimal for detecting defects in the inspection care areas belonging to that group. The assignment of the inspection care areas to the different care area groups and the association of the different threshold settings with the different care area groups, respectively, can be noted in an index. This index can be accessible during the analysis of the optical images and can be used to ensure that each of the inspection care areas in a specific care area group is analyzed based on a corresponding threshold setting that is optimal for that specific care area group. Thus, the methods and systems provide for performing optical inspections of semiconductor wafers using different threshold settings for detecting defects in different groups of inspection care areas without incurring significant cost increases.

What is claimed is:

1. A method comprising:
receiving, by a processor from an optical inspection tool, optical images of multiple care areas on a semiconductor wafer; and,
analyzing, by the processor, the optical images to detect defects in the care areas, the analyzing comprising:
accessing an index of the care areas stored in memory, wherein the index indicates assignment of the care areas to different care area groups that are associated with different combinations of at least two of the following different design properties: pattern density levels, percentages of edges oriented in an x-direction and a y-direction and pattern complexity levels and wherein the index further associates different threshold settings for detecting defects with the different care area groups, respectively; and,
using the index such that each care area in each specific care area group is analyzed based on a corresponding threshold setting associated in the index with the specific care area group.

2. The method of claim 1, wherein the different care area groups comprise:
a first group being a high pattern density, high y-direction, high complexity group;
a second group being a high pattern density, high y-direction, low complexity group;
a third group being a high pattern density, high x-direction, high complexity group;
a fourth group being a high pattern density, high x-direction, low complexity group;
a fifth group being a low pattern density, high y-direction, high complexity group;
a sixth group being a low pattern density, high y-direction, low complexity group;
a seventh group being a low pattern density, high x-direction, high complexity group; and
an eighth group being a low pattern density, high x-direction, low complexity group.

3. The method of claim 1, further comprising generating, by the processor, the index, the generating comprising:
accessing, by the processor from the memory, a design layout for the semiconductor wafer;
defining, by the processor, the care areas throughout the design layout;
assigning, by the processor, the care areas to the different care area groups based on the different design properties; and,
determining, by the processor for each given care area group, a given threshold setting that is optimal for detecting defects in any of the care areas sorted into that given care area group.

4. The method of claim 3, the defining of the care areas being performed based on any of the following:
results of optical rule checking and optical proximity correction processes;
patterned shapes;
rules associated with the patterned shapes; and
functional blocks.

5. The method of claim 3, the assigning comprising:
determining pattern density levels for the care areas and sorting all the care areas into at least two initial groups based on the pattern density levels;
determining percentages of edges in an x-direction and a y-direction for all the care areas and sorting the care areas in each initial group into at least two intermediate groups based on the percentages; and
determining pattern complexity levels for all the care areas and sorting each intermediate group into at least two final groups based on the pattern complexity levels.

6. The method of claim 5, the pattern complexity levels for the care areas being determined based on numbers of vertices in patterned shapes in the care areas.

7. The method of claim 1, further comprising selecting a sample of the care areas for further inspection by a scanning electron-beam microscope to acquire scanning electron-beam microscope images and analyzing the scanning electron-beam microscope images to classify any defects detected in the sample by type.

8. The method of claim 7, the selecting being random.

9. The method of claim 7, further comprising:
before the selecting, ranking defects of interest that can be identified by the optical inspection tool based on probability of impacting yield such that a high ranked defect of interest has a relatively high probability of impacting yield and a low ranked defect of interest has a relatively low probability of impacting yield; and
ranking the different care area groups based on probability of having high ranked defects,
the selecting comprising selecting the sample based on results of the ranking.

10. A system comprising:
a memory storing an index of care areas on a semiconductor wafer, wherein the index indicates assignment of the care areas to different care area groups that are associated with different combinations of at least two of the following different design properties: pattern density levels, percentages of edges oriented in an x-direction and a y-direction and pattern complexity levels and wherein the index further associates different optimal sensitivity thresholds for detecting defects with the different care area groups; and, an optical inspection tool; and a processor in communication with the memory and with the optical inspection tool, the processor receiving, from the optical inspection tool, optical images of the care areas, and the processor analyzing the optical images to detect defects in the care areas, the analyzing comprising accessing the index from the memory and using the index such that each care area in each specific care area group is analyzed based on a corresponding threshold setting associated in the index with the specific care area group.

11. The system of claim 10, wherein the different care area groups comprise:

a first group being a high pattern density, high y-direction, high complexity group;

a second group being a high pattern density, high y-direction, low complexity group;

a third group being a high pattern density, high x-direction, high complexity group;

a fourth group being a high pattern density, high x-direction, low complexity group;

a fifth group being a low pattern density, high y-direction, high complexity group;

a sixth group being a low pattern density, high y-direction, low complexity group;

a seventh group being a low pattern density, high x-direction, high complexity group; and an eighth group being a low pattern density, high x-direction, low complexity group.

12. The system of claim 10, the memory further storing a design layout for the semiconductor wafer and the processor generating the index by performing the following:

accessing the design layout;

defining the care areas throughout the design layout;

assigning the care areas to the different care area groups based on the different design properties; and determining, for each given care area group, a given threshold setting that is optimal for detecting defects in any of the care areas sorted into that given care area group.

13. The system of claim 12, the processor defining the care areas based on any of the following:

results of optical rule checking and optical proximity correction processes;

patterned shapes;

rules associated with the patterned shapes; and functional blocks.

14. The system of claim 12, the processor assigning the care areas to the different care area groups by performing the following:

determining pattern density levels for the care areas and sorting all the care areas into at least two initial groups based on the pattern density levels;

determining percentages of edges in an x-direction and a y-direction for all the care areas and sorting the care areas in each initial group into at least two intermediate groups based on the percentages; and determining pattern complexity levels for all the care areas and sorting each intermediate group into at least two final groups based on the pattern complexity levels.

15. The system of claim 14, the processor determining the pattern complexity levels for the care areas being determined based on numbers of vertices in patterned shapes in the care areas.

16. The system of claim 10, further comprising a scanning electron-beam microscope and the processor further selecting a sample of the care areas for further inspection by the scanning electron-beam microscope to acquire scanning electron-beam microscope images and analyzing the scanning electron-beam microscope images to classify any defects detected in the sample by type.

17. The system of claim 16, the processor performing the selecting of the sample randomly.

18. The system of claim 16, the processor further performing the following:

before the selecting of the sample, ranking defects of interest that can be identified by the optical inspection tool based on probability of impacting yield such that a high ranked defect of interest has a relatively high probability of impacting yield and a low ranked defect of interest has a relatively low probability of impacting yield; and ranking the different care area groups based on probability of having high ranked defects of interest, the processor performing the selecting of the sample based on results of the ranking.

19. A computer program product comprising a computer readable storage medium having program instructions embodied therewith, the program instructions being executable by a processor to cause the processor to perform a method, the method comprising:

receiving, from an optical inspection tool, optical images of multiple care areas on a semiconductor wafer; and, analyzing, by the processor, the optical images to detect defects in the care areas, the analyzing comprising:

accessing an index of the care areas stored in memory, wherein the index indicates assignment of the care areas to different care area groups that are associated with different combinations of at least two of the following different design properties: pattern density levels, percentages of edges oriented in an x-direction and a y-direction and pattern complexity levels and wherein the index further associates different threshold settings for detecting defects with the different care area groups, respectively; and, using the index such that each care area in each specific care area group is analyzed based on a corresponding threshold setting associated in the index with the specific care area group.

20. The computer program product of claim 19, wherein the different care area groups comprise:

a first group being a high pattern density, high y-direction, high complexity group;

a second group being a high pattern density, high y-direction, low complexity group;

a third group being a high pattern density, high x-direction, high complexity group;

a fourth group being a high pattern density, high x-direction, low complexity group;

a fifth group being a low pattern density, high y-direction, high complexity group;

a sixth group being a low pattern density, high y-direction, low complexity group;

a seventh group being a low pattern density, high x-direction, high complexity group; and an eighth group being a low pattern density, high x-direction, low complexity group.

* * * * *